(12) United States Patent
Lu et al.

(10) Patent No.: US 9,771,878 B2
(45) Date of Patent: Sep. 26, 2017

(54) THRUST SCHEDULING METHOD FOR VARIABLE PITCH FAN ENGINES AND TURBO-SHAFT, TURBO-PROPELLER ENGINES

(71) Applicant: General Electric Company, Schenectady, NY (US)

(72) Inventors: Manxue Lu, Swampscott, MA (US); Jeffrey Anthony Hamel, Maineville, OH (US)

(73) Assignee: General Electric Company, Schenectady, NY (US)

(*) Notice: Subject to any disclaimer, the term of this patent is extended or adjusted under 35 U.S.C. 154(b) by 359 days.

(21) Appl. No.: 14/886,169

(22) Filed: Oct. 19, 2015

(65) Prior Publication Data
US 2017/0107914 A1 Apr. 20, 2017

(51) Int. Cl.
*F02C 9/58* (2006.01)
*F02C 9/54* (2006.01)
(Continued)

(52) U.S. Cl.
CPC ............ *F02C 9/58* (2013.01); *B64D 27/10* (2013.01); *F02C 9/44* (2013.01); *F02C 9/54* (2013.01);
(Continued)

(58) Field of Classification Search
CPC ...... F02C 9/58; F02C 9/54; F02C 9/44; F02K 3/06; F02K 1/66; B64D 27/10;
(Continued)

(56) References Cited

U.S. PATENT DOCUMENTS

| 3,932,058 | A | | 1/1976 | Harner et al. |
| 3,936,226 | A | | 2/1976 | Harner et al. |
| 4,242,864 | A | * | 1/1981 | Cornett ................ F02K 1/17 |
| | | | | 60/226.1 |

(Continued)

FOREIGN PATENT DOCUMENTS

| EP | 1178196 A2 | 2/2002 |
| GB | 2461811 A | 1/2010 |

OTHER PUBLICATIONS

European Search Report and Opinion issued in connection with corresponding EP Application No. 16194479.8 dated Mar. 3, 2017.

*Primary Examiner* — Michael J Zanelli
(74) *Attorney, Agent, or Firm* — Pamela A. Kachur

(57) ABSTRACT

A thrust scheduling method for a gas turbine engine that includes a plurality of blades having a variable pitch beta angle is provided. The method can include receiving into a control system at least one condition input from a respective sensor; receiving into a control system a low pressure shaft speed from a low pressure shaft speed sensor; receiving a control command from a full authority digital engine control (FADEC) in the control system; generating a low pressure shaft speed base reference from a first schedule logic in the control system based upon the at least one condition input received and the control command received; generating a beta angle base reference from a second schedule logic from the at least one condition input received, the low pressure shaft speed, and the control command received; and supplying the low pressure shaft speed base reference and the beta angle base reference to an engine control system, wherein the engine control system adjusts at least the pitch angle of the plurality of fan blades or a fuel flow to the engine.

17 Claims, 10 Drawing Sheets

(51) Int. Cl.
    *B64D 27/10*       (2006.01)
    *F02K 1/66*        (2006.01)
    *F02K 3/06*        (2006.01)
    *F02C 9/44*        (2006.01)

(52) U.S. Cl.
    CPC ............... *F02K 1/66* (2013.01); *F02K 3/06* (2013.01); *F05D 2220/323* (2013.01); *F05D 2270/051* (2013.01); *F05D 2270/303* (2013.01); *F05D 2270/304* (2013.01); *F05D 2270/3011* (2013.01)

(58) Field of Classification Search
    CPC ......... F05D 2270/051; F05D 2270/303; F05D 2270/304; F05D 2270/3011; F05D 2220/323
    See application file for complete search history.

(56) References Cited

U.S. PATENT DOCUMENTS

| | | |
|---|---|---|
| 4,772,179 A | 9/1988 | Bennett et al. |
| 4,772,180 A | 9/1988 | Walker et al. |
| 4,927,329 A | 5/1990 | Kilman et al. |
| 5,023,793 A * | 6/1991 | Schneider ............. B64C 11/303 290/44 |
| 5,199,850 A | 4/1993 | Carvalho et al. |
| 5,391,055 A | 2/1995 | Carvalho |
| 5,481,648 A | 1/1996 | Volponi et al. |
| 8,075,270 B2 | 12/2011 | Violette et al. |
| 8,545,178 B2 | 10/2013 | Perkinson et al. |
| 8,689,539 B2 | 4/2014 | Lu et al. |

* cited by examiner

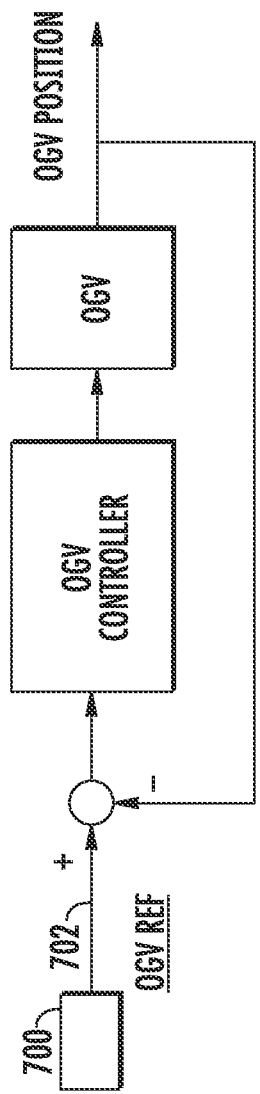

$\triangle BETA = BETA\_REF - BETA$
THRUST REVERSE $\triangle NxC = NxC\_REF - NxC$
GROUND TAXI

THRUST SCHEDULING METHOD FOR VARIABLE PITCH FAN ENGINES AND TURBO-SHAFT, TURBO-PROPELLER ENGINES

FIELD OF THE INVENTION

The current disclosure pertains to a control system for variable pitch fan engines and turbo-shaft, turbo-propeller engines.

BACKGROUND OF THE INVENTION

In some fan engines (also known as "propfan" engines), the axis of the fan propeller is parallel to or coaxial with the axis of the gas engine. Typically, in a turbo-shaft, turbo-propeller engine, the axis of one or more propellers will be perpendicular to the axis of the gas engine. In both configurations, the fan or propeller may have a fixed pitch or a variable pitch. If the pitch is variable, the engine may also have a dedicated pitch change mechanism (PCM). The propeller speed (Nx) is proportional to the gas engine power turbine shaft speed (Np) via a pure mechanical gear-train transformation, that is, Nx=Kgb*Np where Kgb is a constant that represents the gear ratio. Controlling the propeller speed, Nx, is equivalent to controlling the power turbine speed, Np. The primary challenge is to coordinate control of the propeller speed (Nx) or the Power Turbine speed (Np) (denoted generically as Nx due to their relationship with each other), the HP shaft speed (N2), and any PCM pitch angle while maintaining a set of active constraints including but not limited to core pressure (Px), exhaust temperature (T), core speed rate (N2dot), and/or torque (Tq) to stay with defined limits, while rejecting external disturbances including but not limited to load change and/or internal known disturbances including but not limited to variable bleed valves and variable stator vanes. The challenge includes two important aspects, one is what control system should be designed to realize the coordinate control objectives, the other is what control references should be scheduled for the control system to follow and achieve the expected control objectives.

There remains a need for a systematic control reference scheduling method to provide coordinate references for a variable pitch fan engine or a turbo-shaft, turbo propeller engine control system.

BRIEF DESCRIPTION OF THE INVENTION

Aspects and advantages of the invention will be set forth in part in the following description, or may be obvious from the description, or may be learned through practice of the invention.

A thrust scheduling method is generally provided for a gas turbine engine that includes a plurality of blades having a variable pitch beta angle. In one embodiment, the method includes receiving into a control system at least one condition input from a respective sensor; receiving into a control system a low pressure shaft speed from a low pressure shaft speed sensor; receiving a control command from a full authority digital engine control (FADEC) in the control system; generating a low pressure shaft speed base reference from a first schedule logic in the control system based upon the at least one condition input received and the control command received; generating a beta angle base reference from a second schedule logic from the at least one condition input received, the low pressure shaft speed, and the control command received; and supplying the low pressure shaft speed base reference and the beta angle base reference to an engine control system, wherein the engine control system adjusts at least the pitch angle of the plurality of fan blades or a fuel flow to the engine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE FIGURES

A full and enabling disclosure of the present invention, including the best mode thereof, directed to one of ordinary skill in the art, is set forth in the specification, which makes reference to the appended FIGS.

FIG. 2B is a block diagram representation of a primary control architecture for an variable pitch outer guide vane for a turbo shaft turboprop engine for an aircraft in flight.

Figure 1:
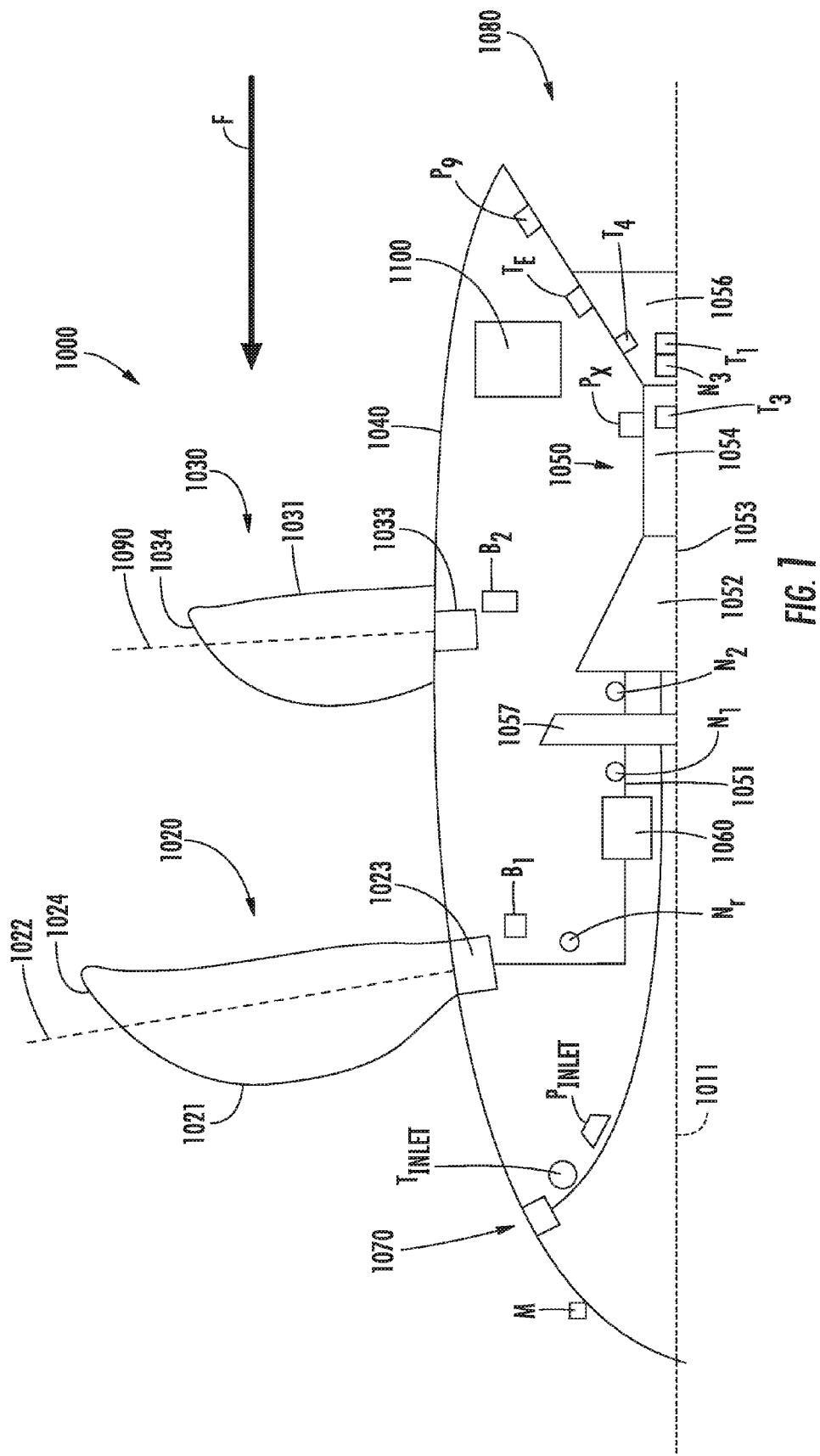
FIG. 1 is a cross-sectional view of an exemplary turbo shaft turboprop engine.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The current disclosure provides a set of base references and transient references to a control system where the fan or propeller (fan propeller) and the gas engine are treated as a single controlled plant. The control system architecture includes all outputs and constraints to be controlled, considers known disturbances rejection and is robust to drastic changes in the references. It follows that the current disclosure provides a systematic and coordinated thrust scheduling solution for the control of variable pitch fan engines and turbo-shaft, turbo propeller engines, whether ducted or unducted.

A thrust scheduling method is generally provided herein for variable pitch fan engines and turbo-shaft and/or turbo propeller engine architectures that employ a variable pitch propulsor. Generally, the thrust scheduling method uses the sign of the rotor blade angle to differentiate the forward thrust from the reverse thrust; uses the engine speed and Rotor speed together with beta angle to schedule the thrust level; uses original logic and transient schedules to anticipate the commanded or un-commanded changes in different operating modes and compensate the changes such that the speeds can achieve smoother and faster transients while enhancing the system efficiency; uses the rotor speed and blade pitch angle coordinating with engine speed to gain the SFC reduction; and/or schedules the engine variable geometries to coordinate with the engine speed, pressure and temperature to assure the operability and engine limits protection. Thus, the thrust scheduling method can allow broad applications for more efficient engine operation to meet the performance requirements.

In one embodiment, the thrust scheduling method is based on engine core speed, propulsor speed and the fan pitch angle. The method can provide coordinated control references for the control system to control thrust and operability coordinately, while achieving the optimal system efficiency. By utilizing an inlet temperature sensor ($T_{Inlet}$) and a Beta angle sensor (B1), the thrust scheduling system can allow the control system to achieve optimal efficiency and simplicity. Additionally, the present method can provide coordinated anticipation action and transient schedules for the control system to anticipate the commanded or un-commanded changes in different operating modes and compensate the changes such that the speeds can achieve smoother and faster transients while enhancing the system efficiency. Finally, the present method can provide a coordinated schedule for noise reduction by scheduling the outlet guide vane (OGV) pitch angle to coordinate with the rotor pitch angle and rotor speed such that the noise is minimized, particularly during takeoff and landing phase.

In one embodiment, since two different pitch angles (one for forward thrust and one for reverse thrust) set same propulsor speed (or engine speed) are used to differentiate forward thrust from reverse forward, the pitch angle is specified with two distinctive values, respectively, (1) specify pitch angle forward direction: +Beta angle for forward thrust indication; and (2) reverse direction: − Beta angle for reverse thrust indication.

Figure 3:
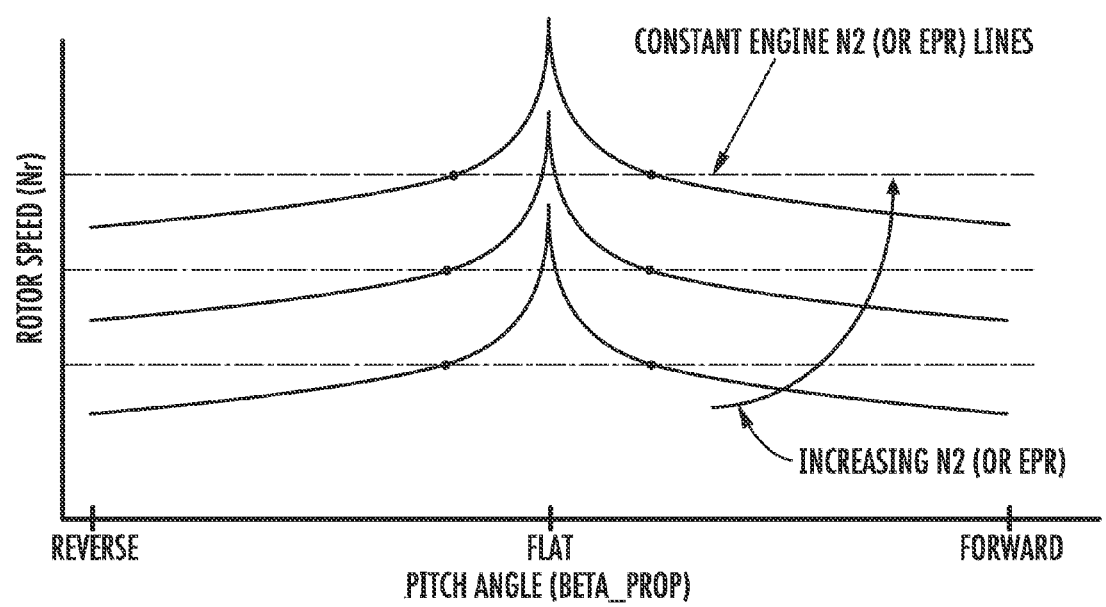
FIG. 3 illustrates forward and reverse pitch angle solutions for a given combination of Nx and N2.
Figure 4:
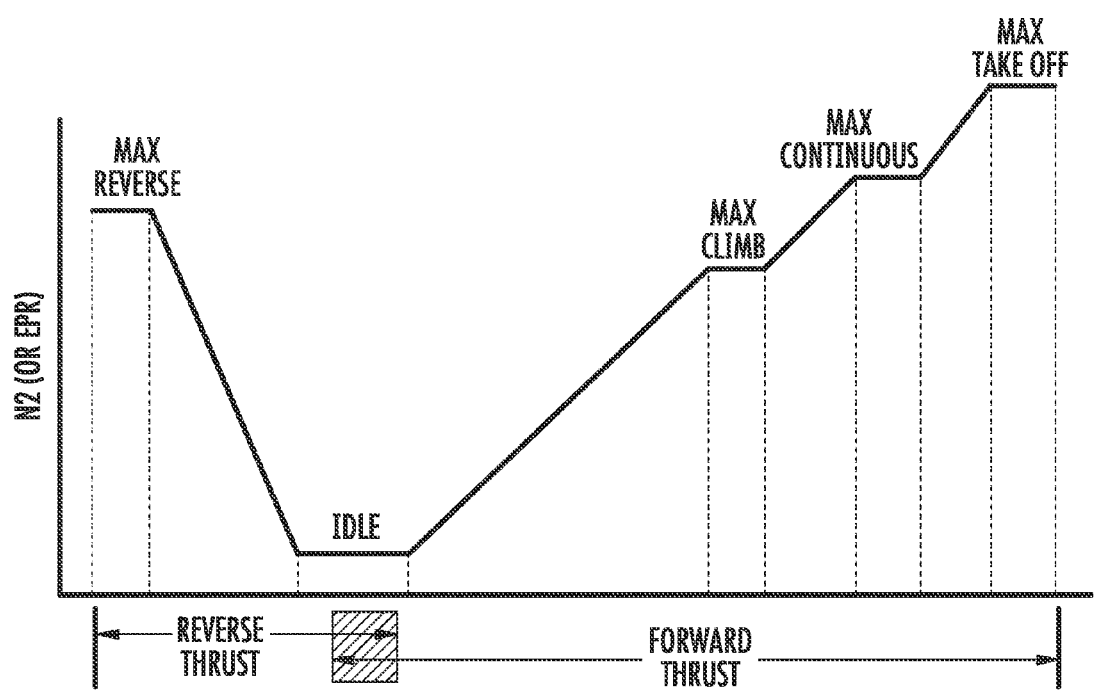
FIG. 4 is an exemplary proposed power management schedule for a variable pitch fan engine.

In one embodiment, the present method schedules engine speed value (N2), rotor speed (Nx), and Pitch Angle (Beta_Prop) to map requested thrust with respect to different inlet temperatures ($T_{Inlet}$): higher Np→higher thrust, as shown in FIGS. 3 and 4. Additionally, the present method can also schedule Pitch Angle (Beta_Prop) to coordinate with rotor speed to meet same thrust request but result in lower specific fuel coefficient (SFC) since lower Beta leads to higher Nx & less drag.

As such, the control systems include blade angle (Beta) detection via angle sensors so that the engine can efficiently and quickly respond to throttle angle inputs. In one embodiment, two sensors are utilized to detect the angle of the rotor blade (Beta 1) and the angle of the outer guide vane (OGV) (Beta 2), whereas other embodiments only need the rotor angle since the OGV is not present. To schedule forward, reverse and idle thrust, the control system requires torque, speed, pressure, temperature, and angle sensors. A summary of the sensor configuration for the engine control is summarized below in FIG. 1.

FIG. 1 shows a cross-sectional view of an exemplary embodiment of an unducted thrust producing system 1000. As is seen from FIG. 1, the unducted thrust producing system 1000 takes the form of an open rotor propulsion system and has a rotating element 1020 depicted as a propeller assembly which includes an array of airfoil blades 1021 around a central longitudinal axis 1011 of the unducted thrust producing system 1000. Blades 1021 are arranged in typically equally spaced relation around the central longitudinal axis 1011, and each blade 1021 has a root 1023 and a tip 1024 and a span defined therebetween. Left- or right-handed engine configurations can be achieved by mirroring the blades 1021 (and vanes 1031 discussed below). As an alternative, an optional reversing gearbox (located in or behind the turbine 1050 or combined or associated with power gearbox 1060) permits a common gas generator and low pressure turbine to be used to rotate the fan blades either clockwise or counterclockwise, i.e., to provide either left- or right-handed configurations, as desired, such as to provide a pair of oppositely-rotating engine assemblies as may be desired for certain aircraft installations. Unducted thrust producing system 1010 in the embodiment shown in FIG. 1 also includes an integral drive (power gearbox) 1060 which may include a gearset for decreasing the rotational speed of the propeller assembly relative to the engine 1050.

For reference purposes, FIG. 1 also depicts a Forward direction denoted with arrow F, which in turn defines the forward and aft portions of the system. As shown in FIG. 1, the rotating element 1020 in a "puller" configuration is located forward of the housing 1040, while the exhaust 1080 is located aft of the stationary element 1030. The housing 1040 generally includes a gas turbine engine or other engine configured to provide sufficient energy to turn the rotating elements 1020 to create thrust.

Unducted thrust producing system 1000 also includes in the exemplary embodiment a non-rotating stationary element 1030 which includes an array of vanes 1031 also disposed around central axis 1011, and each blade 1031 has a root 1033 and a tip 1034 and a span defined therebetween. These vanes may be arranged such that they are not all equidistant from the rotating assembly, and may optionally include an annular shroud or duct (not shown) distally from axis 1011 or may be unshrouded. These vanes 1031 are mounted to a stationary frame and do not rotate relative to the central axis 1011, but may include a mechanism for adjusting their orientation relative to their axis and/or relative to the blades 1021.

In operation, the rotating blades 1021 are driven by the low pressure turbine 1057 via gearbox 1060 such that they rotate around the axis 1011 and generate thrust to propel the unducted thrust producing system 1000, and hence an aircraft to which it is associated, in the forward direction F. The propulsor speed, or low pressure shaft speed, (N1) of rotation of the blades 1021 is measured by sensor (N1), on the low pressure shaft 1051.

Each of the sets of blades 1021 and vanes 1031 incorporate a pitch change mechanism such that the blades can be rotated with respect to an axis of pitch rotation either independently or in conjunction with one another. Such pitch change can be utilized to vary thrust and/or swirl effects under various operating conditions, including to provide a thrust reversing feature which may be useful in certain operating conditions such as upon landing an aircraft. The pitch angle, or beta-angle, of the blades 1021 is measured by the beta angle sensor (B1), and the pitch angle, or beta-angle, of the vanes 1031 is measured by the beta angle sensor (B2).

Vanes 1031 are sized, shaped, and configured to impart a counteracting swirl to the fluid so that in a downstream direction aft of both rows of blades the fluid has a greatly reduced degree of swirl, which translates to an increased level of induced efficiency. Vanes 1031 may have a shorter span than blades 1021, as shown in FIG. 1, for example, 50% of the span of blades 1021, or may have longer span or the same span as blades 1021 as desired. Vanes 1031 may be attached to an aircraft structure associated with the propulsion system, as shown in FIG. 1, or another aircraft structure such as a wing, pylon, or fuselage. Vanes 1031 of the stationary element may be fewer or greater in number than, or the same in number as, the number of blades 1021 of the rotating element and typically greater than two, or greater than four, in number.

In the embodiment shown in FIG. 1, an inlet 1070 provides a path for incoming atmospheric air to enter the housing 1040. The inlet temperature within the inlet is measured by inlet temperature sensor (TInlet), and the inlet pressure within the inlet is measured by inlet pressure sensor EP ($P_{Inlet}$).

FIG. 1 illustrates what may be termed a "puller" configuration where the thrust-generating rotating element 1020 is located forward of the housing 1040 of the engine, as opposed to a "pusher" configuration embodiment where the core engine 1050 is located forward of the rotating element 1020. The exhaust 1080 is located inwardly of and aft of both the rotating element 1020 and the stationary element 1030.

The selection of "puller" or "pusher" configurations may be made in concert with the selection of mounting orientations with respect to the airframe of the intended aircraft application, and some may be structurally or operationally advantageous depending upon whether the mounting location and orientation are wing-mounted, fuselage-mounted, or tail-mounted configurations.

The embodiment of FIG. 1 shows a gas turbine engine 1050 including a compressor 1052, a combustor 1054, and a turbine 1056 which work together to turn a high pressure shaft 1053 extending along the central longitudinal axis 1011. However, in other embodiments, a low pressure turbine 1057 can be utilized with any gas generator positioned within the housing 1040 to turn the shaft. The shaft speed, or core speed, is measured as the rotational speed of the shaft by the core speed sensor N2 of the gas turbine engine 1050. The temperature of the combustor 1054 is measured by the combustor temperature sensor T3, and the pressure within the combustor 1054 is measured by the combustor pressure sensor P3 Px. The temperature of the HP turbine is measured by the HP turbine temperature sensor T4, and the speed of the turbine 1054 is measured by the HP turbine speed sensor N3. The torque produced by the turbine 1056 on the shaft is measure at the torque sensor T1. Finally, the pressure of the exhaust exiting the turbine 1056 is measured by the pressure sensor P9.

Each of these sensors is in communication with one or more controllers may comprise a computer or other suitable processing unit. The controller may include suitable computer-readable instructions that, when implemented, configure the controller to perform various different functions, such as receiving, transmitting and/or executing signals from the sensors. A computer generally includes a processor(s) and a memory. The processor(s) can be any known processing device. Memory can include any suitable computer-readable medium or media, including, but not limited to, RAM, ROM, hard drives, flash drives, or other memory devices. Memory stores information accessible by processor(s), including instructions that can be executed by processor(s). The instructions can be any set of instructions that when executed by the processor(s), cause the processor(s) to provide desired functionality. For instance, the instructions can be software instructions rendered in a computer-readable form. When software is used, any suitable programming, scripting, or other type of language or combinations of languages may be used to implement the teachings contained herein. Alternatively, the instructions can be implemented by hard-wired logic or other circuitry, including, but not limited to application-specific circuits. The computing device can include a network interface for accessing information over a network. The network can include a combination of networks, such as Wi-Fi network, LAN, WAN, the Internet, cellular network, and/or other suitable network and can include any number of wired or wireless communication links. For instance, computing device could communicate through a wired or wireless network with each sensor and other systems of the engine (e.g., the engine logic control).

The general engine control logic, which can be executable in an engine controller and/or full authority digital engine control (FADEC) 1100 in certain embodiments, uses the Low Pressure Shaft speed (N1) and the High Pressure Shaft speed (N2) in combination with torque (T1) and Beta angle (B1, B2) to modulate fuel flow (Wf) and schedule thrust. Whereas traditional control systems utilize Engine Pressure Ratio (EPR), the HP shaft speed (N2) provides several advantages. Fuel flow directly correlates to torque (T1) and HP shaft speed (N2 through the HP shaft natural rotational dynamics, hence the fuel flow (Wf) and HP shaft speed (N2) dynamic relationship is explicitly physics based and can be easily modeled. On the other hand, the EPR dynamics are difficult to model since it is highly dependent on upstream and downstream flowpath conditions. Thus, EPR is not explicitly dominated by fuel flow.

One component of the presently provided control system is the ability to differentiate between forward and reverse thrust. For a given core speed (N2) or propulsor speed (Nx), there are two solutions for propulsor pitch angle (Beta). One such solution is for forward thrust, and the second solution is for reverse thrust. To differentiate between the two solutions, the control system contains angle sensors to detect pitch angle (Beta). FIG. 3 illustrates forward and reverse Beta solutions for a given combination of N1 and N2. The power management system uses throttle angle inputs to determine if forward or reverse thrust is being requested, thus determining the appropriate Beta angle solution for the scheduled N1 and N2. When reverse thrust is selected, the throttle reverse signal triggers an open loop control of Beta servo loop. The pitch change mechanism uses max torque to drive Beta passing flat pitch and into reverse until the specified Beta angle is met. At this point, the closed loop fuel flow and beta control resume in reverse thrust.

The thrust scheduling system utilizes N1, N2, $T_{Inlet}$, $P_{Inlet}$, Beta angles, torque and fuel flow meters to modulate thrust to satisfy throttle angle inputs. The inlet temperature ($T_{Inlet}$) provides information about the flight condition at which the propulsion system is operating. The inlet temperature ($T_{Inlet}$) sensor enables the thrust scheduling system to schedule Nx to optimal tip speeds for performance and acoustics throughout the flight envelope. The thrust scheduling system maps N2 to beta angle, and thus, thrust, for the corresponding Nx at a given flight condition. Nx is dictated by throttle angle and $T_{Inlet}$, Beta needs to be coordinated to map to Nx for higher thrust and less drag, accordingly, N2 is determined by throttle angle and Mach and $T_{Inlet}$ and/or $P_{Inlet}$ to produce desired thrust for given Nx and Beta. An example of a proposed power management schedule is shown in FIG. 4.

The thrust scheduling system also uses combustor pressure limiters (Px), the HP turbine temperature (T4), and torque (T1) as constraints to ensure operability of the engine. During takeoff mode, torque is the primary constraint. In high power operation, the HP turbine temperature (T4) could be the constraint of highest priority to protect the HP turbine from overheating. Through descent and idle, combustor pressure limiters (Px) may be the constraint of highest priority to protect the combustor from flameout. Engine speed derivative and power turbine speed derivative are scheduled as constraints to prevent overspeeds.

Overspeed detection can utilize N1 and N3 sensors to alert the control system to possible overspeed conditions. Overspeed is indicated by a discrepancy of the ratio of N1 to N3, which are related through the gearbox ratio. Once a discrepancy is detected, fuel flow is cut off to prevent an overspeed condition from occurring and rotor blades are moved to the feather position.

The generic control system controls thrust by following the scheduled references and maintains the engine operation staying within the constraints.

Figure 2A:
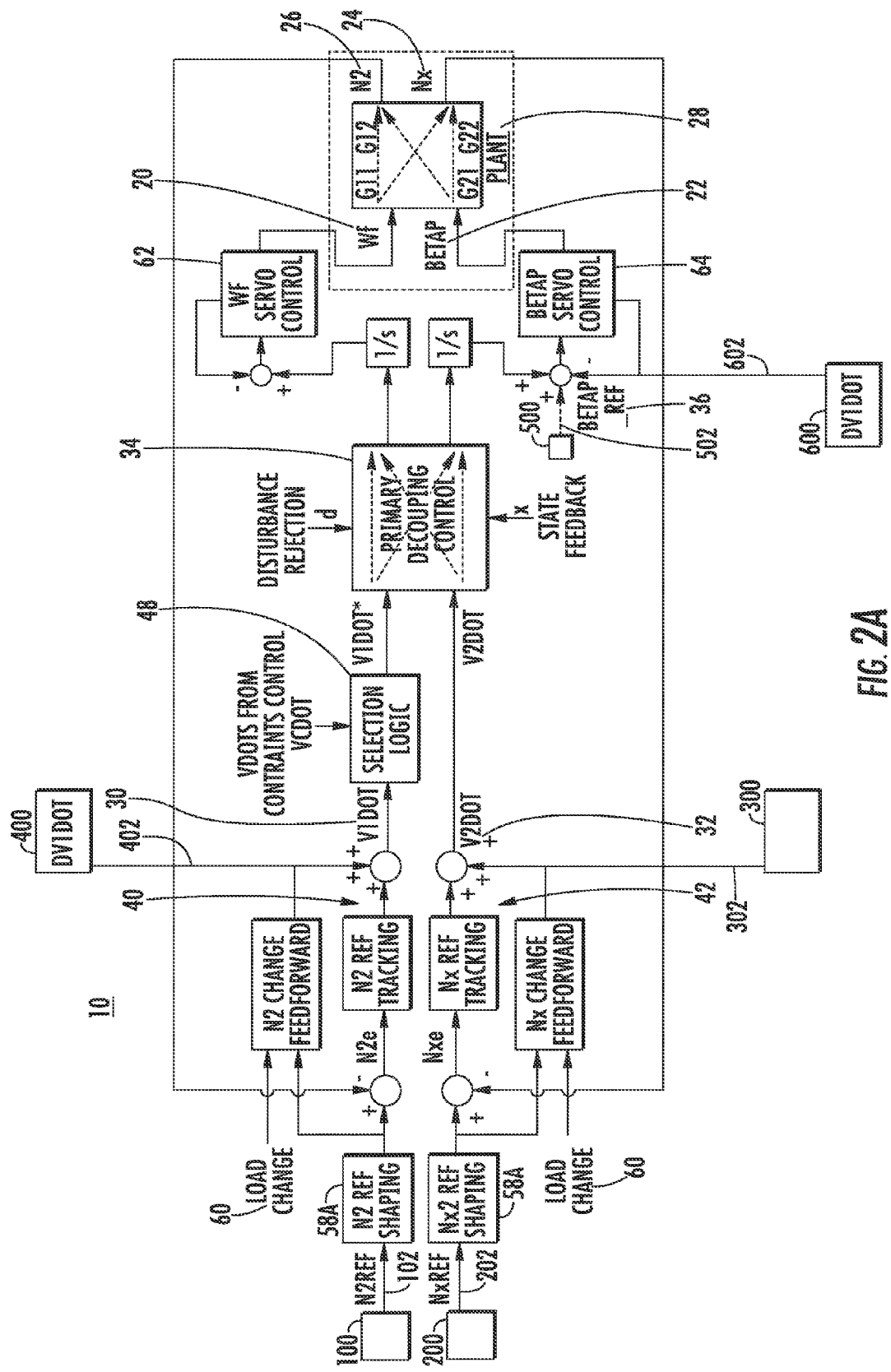
FIG. 2A is a block diagram representation of a primary control architecture for an variable pitch fan engine or a turbo shaft turboprop engine for an aircraft in flight.

An example of the generic control system is shown below in FIG. 2A for an embodiment of a variable pitch fan engine or turbo-shaft, turbo-propeller engine. The control inputs are fuel flow (Wf) 20 from the fuel actuator (integrated into the fuel flow servo control 62) and PCM pitch angle (BetaP) 22 from the PCM actuator (integrated into the PCM pitch angle servo control 64). The other variable geometries (VG) are considered as known disturbance inputs. One of the controlled outputs, 24 may be either the propeller speed (Nx) or the power turbine shaft speed (N1) based on the relationship Nx=Kgb*N1 and denoted as Nx. A second controlled output, 26 may be any of the engine core speed (N2), engine pressure ratio (EPR) and engine torque (Tq). For clarity and brevity, the controlled outputs, 24, 26 presented herein for the following formulation are Nx (first controlled output 24) and N2 (second controlled output 26). Typical constraints for the control methodology may include minimum and maximum limits such as, but not limited to: minimum pressure limit (MinPx), maximum pressure limit (MaxPx), maximum temperature limit (MaxT), maximum torque limit (MaxTq), minimum speed rate limit (MinN2dot), and maximum speed rate limit (MaxN2dot).

The controlled outputs 24, 26 N2 and Nx form the basis of feedback loops in the control system architecture 10. These feedback signals are combined with shaped (or filtered) references denoted as N2Ref and NxRef. The combinations of the feedback signals and the shaped references N2Ref and NxRef form tracking error signals. The tracking error signals may go through reference tracking single-input single-output (SISO) controls then be combined with feed-forward control actions that result from accounting for the effects of aerodynamic loading changes on the controlled outputs 24, 26 (Nx and N2).

Figure 5:
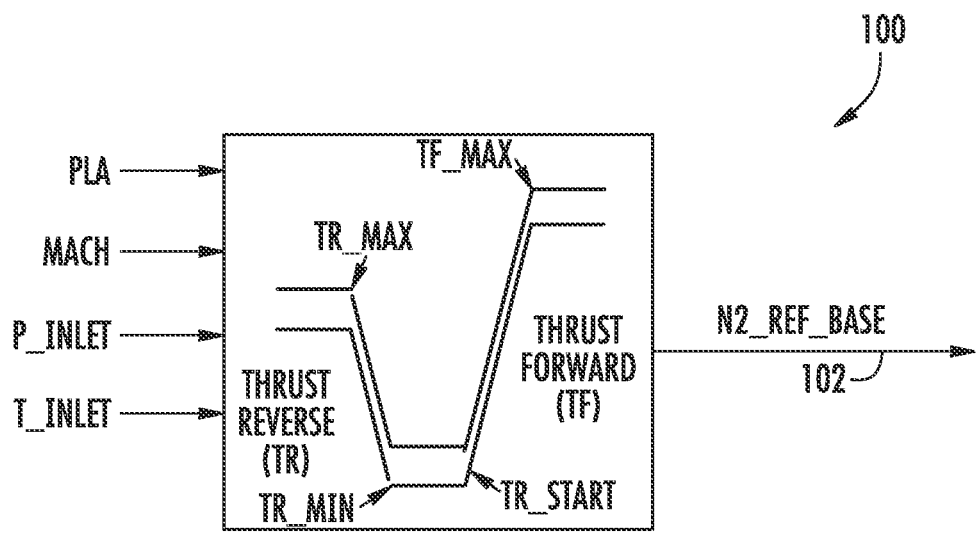
FIG. 5 is an exemplary scheduling of the base input N2Ref supplied for the N2Ref shaping.

FIG. 5 shows the scheduling of the base input N2Ref 100 supplied for the N2Ref shaping. The base input N2Ref 100 is formed from the power lever angle (PLA) from pilot command, airplane speed (Mach) supplied from an airplane sensor, inlet pressure ($P_{Inlet}$) from the inlet pressure sensor, and the inlet temperature (TInlet) from the inlet temperature sensor. Depending on the particular operating conditions, taken from the inputs, the N2_Ref_Base 102 is calculated according to the schedule.

Figure 6:
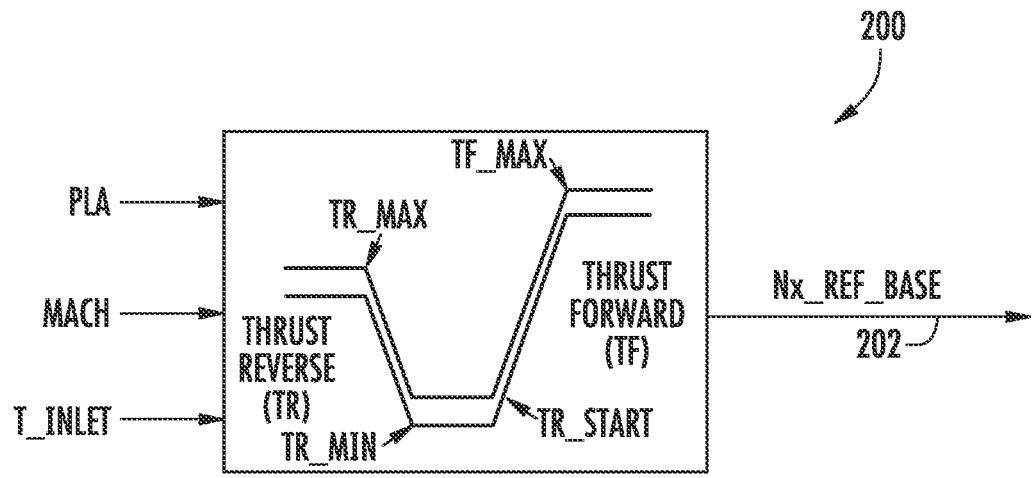
FIG. 6 is an exemplary scheduling of the base input NxRef supplied for the NxRef shaping.

FIG. 6 shows the scheduling of the base input NxRef 200 supplied for the NxRef shaping. The base input NxRef 200 is formed from the power lever angle (PLA) from pilot command, airplane speed (Mach) supplied from an airplane sensor, and inlet temperature ($T_{Inlet}$) from the inlet temperature sensor. Depending on the particular operating conditions, taken from the inputs, the Nx_Ref_Base 202 is calculated according to the schedule.

The combination of the reference tracking SISO control outputs and the feedforward controls forms the pseudo-inputs 30, 32 (v1dot, v2dot). Application of selection logic 48 for selecting the most demanding input from the pseudo-inputs results from constraint decoupling control and a controlled output tracking control. The pseudo-inputs resulting from constraint decoupling control may replace at least one of the pseudo inputs 30, 32 and form the inputs for the primary decoupling control 34. The output of the primary decoupling control forms the basis of the control input commands. The control input commands feed the fuel flow servo control 62 and the PCM pitch angle servo control 64 along with the controlled plant 28 that generates the controlled outputs 24, 26 and controlled constraints 50.

Figure 7A:
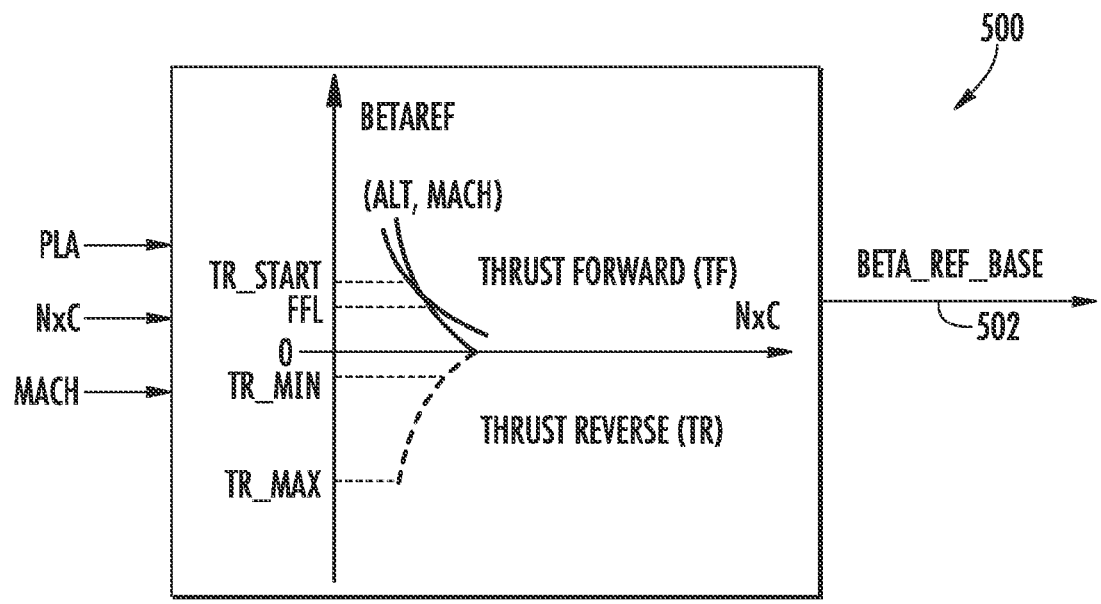
FIG. 7A shows the scheduling of the base input B_Ref_Base supplied to the BetaP Servo control depending on forward or reverse thrust signal.

FIG. 7A shows the scheduling 500 of the base input B_Ref_Base 502 supplied to the BetaP Servo control 64 (i.e., the control unit for adjusting the pitch of the blades 1021 in FIG. 1). The B_Ref_Base 502 is calculated using inputs formed from the power lever angle (PLA) from pilot command, airplane speed (Mach) supplied from an airplane sensor, and the low pressure shaft speed N1 to set the pitch of the rotor blades 1021 depending on the forward or reverse thrust signal. In this schedule and the other schedules, a temperature correction can be performed based on these equations:

$NxC\_Ref=Nx\_Ref\_Base/sqrt(\theta 2)$; where $\theta 2=T_{inlet}/518.67$;

$NxC=Nx/sqrt(\theta 2)$; where $\theta 2=T_{inlet}/518.67$; and $N2C=N2/sqrt(\theta 25)$; where $\theta 25=T_{discharge}/518.67$, where $T_{discharge}$ is the discharge temperature in HP compressor (after compressor, before entering combustor).

Figure 8:
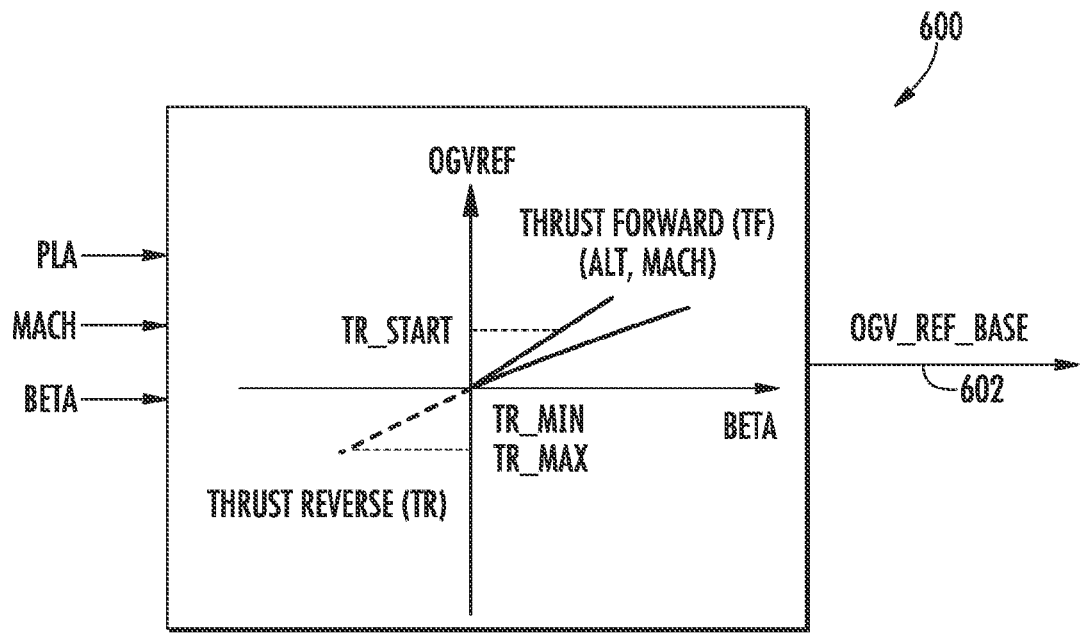
FIG. 8 shows the scheduling of the base input OGV_Ref_Base supplied to the OGV Servo control.

Similarly, FIG. 8 shows the scheduling of the base input OGV_Ref_Base 602 supplied to the OGV Servo control FIG. 2B (i.e., the control unit for adjusting the pitch of the vanes 1031 in FIG. 1). The OGV_Ref_Base is calculated using inputs formed from the power lever angle (PLA) from pilot command, airplane speed (Mach) supplied from an airplane sensor, and the beta angle of the propulsor blade (B1) to set the pitch of the OGV vanes 1031 depending on the forward or reverse thrust signal.

Figure 9A:
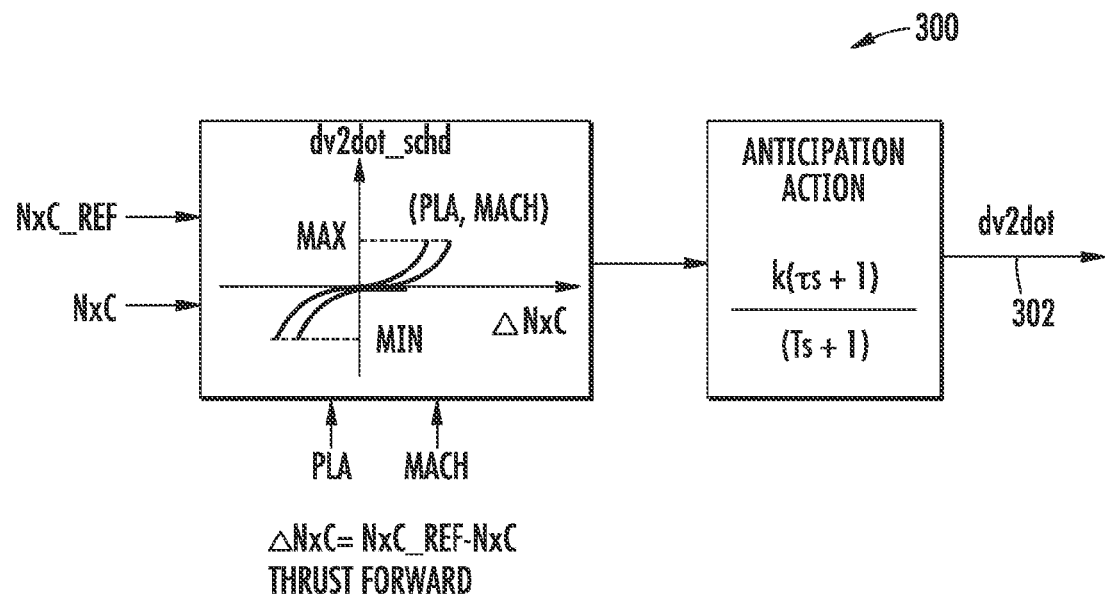
FIG. 9A shows the scheduling of the dv2dot signal in forward thrust.

In forward thrust and flight at constant PLA, the transient schedule and logic for generating dv2dot are used for faster compensation of un-commanded Nx changes caused by airplane maneuvers and/or cross winds. Nx and N2 are coordinated by 2×2 MIMO control. FIG. 9A shows the scheduling of the dv2dot signal 302 from logic 300 calculated using inputs formed from the power lever angle (PLA) from pilot command, airplane speed (Mach) supplied from an airplane sensor, and the low pressure shaft speed N1 (which is equal to the rotor speed Nx).

Figure 7B:
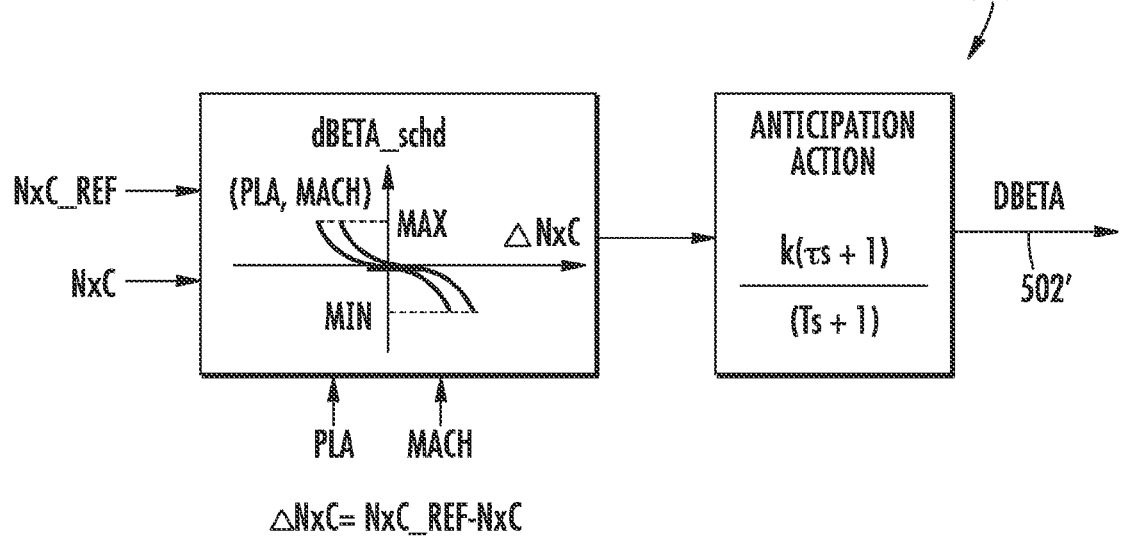
FIG. 7B shows the scheduling of the dBeta supplied to the BetaP Servo control in forward thrust.

In Forward Flight between landing & Thrust Reverse start phase, the transient schedule and logic for generating dv2dot shown in FIG. 9A are used for faster Nx response resulted from PLA commanded NxRef/N2Ref changes. Beta is taken out of 2×2 Control, and controlled directly by the combination of Beta_Ref_Base and dBeta calculated by Beta transient schedule and logic to get ready for Thrust Reverse. FIG. 7B shows the scheduling 500' of the dBeta 502' supplied to the BetaP Servo control 64 in forward thrust. The dBeta 502' is calculated using inputs formed from the power lever angle (PLA) from pilot command, airplane speed (Mach) supplied from an airplane sensor, and the low pressure shaft speed N1 (which is equal to the rotor speed Nx) to set the pitch of the rotor blades 1021.

Figure 7C:
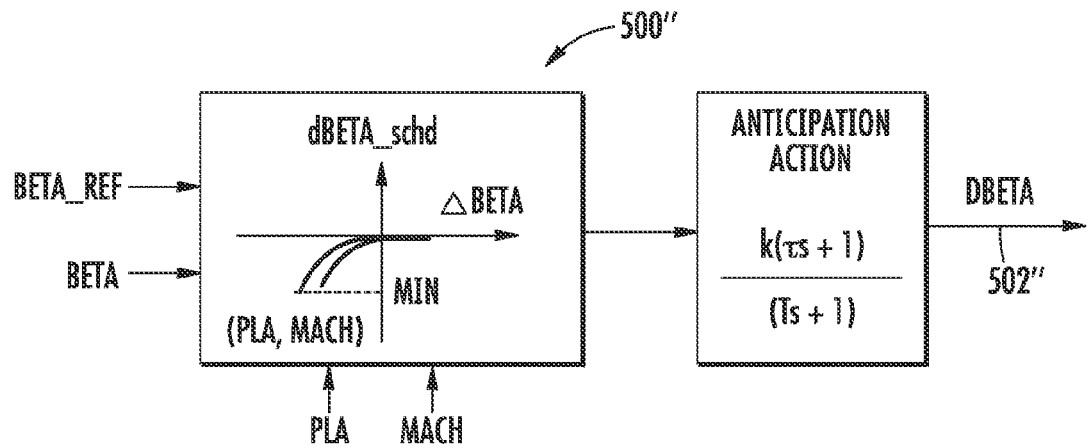
FIG. 7C shows the scheduling of the dBeta supplied to the BetaP Servo control in reverse thrust.
Figure 9B:
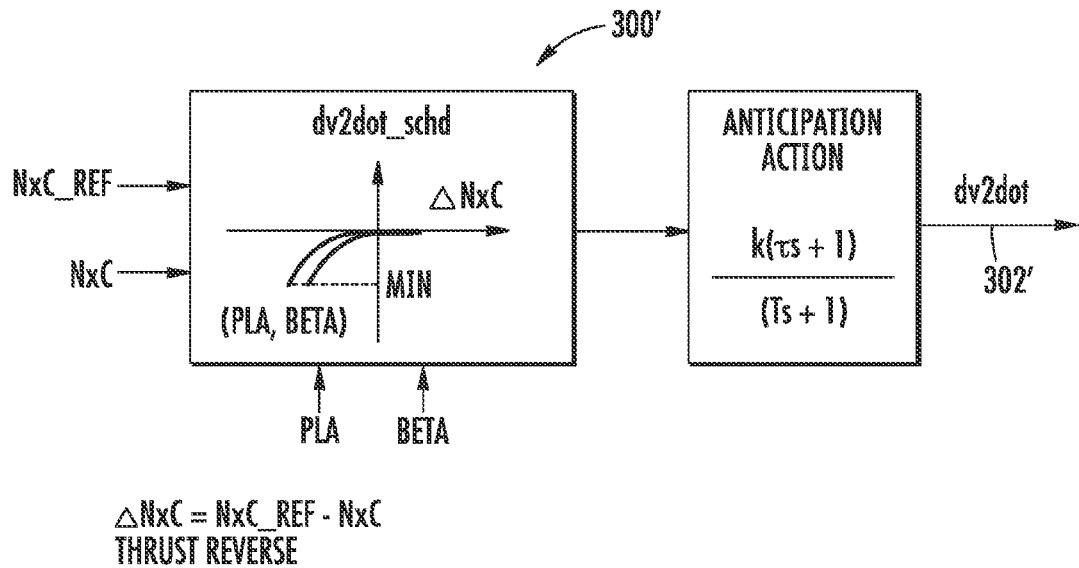
FIG. 9B shows the scheduling of the dv2dot signal in reverse thrust, phase 1.

In reverse thrust, the engine goes through at least two phases. In a first phase of thrust reverse, Nx follows the NxRef specified by Nx_Ref_Base, and the transient schedule and logic 300' are used for generating dv2dot 302' for compensating Nx response. FIG. 9B shows the scheduling 300' of the dv2dot 302' calculated using inputs PLA, NxC, NxC_Ref and Beta and supplied to the input of Primary Decoupling control 34 in thrust reverse first phase. The Beta is kept out of 2×2 Control, and controlled directly by the combination of Beta_Ref_Base schedules Beta in negative region and dBeta calculated by Beta transient schedule and logic for thrust reverse first phase. FIG. 7C shows the scheduling 500" of the dBeta 502" supplied to the input of BetaP Servo control 64 in forward thrust. The dBeta 502" is calculated using inputs from the power lever angle (PLA) from pilot command, airplane speed (Mach) from an airplane sensor, and the Beta angle from a Beta angle sensor. Beta goes through FFL and 0 to a minimum negative Beta angle.

Figure 9C:
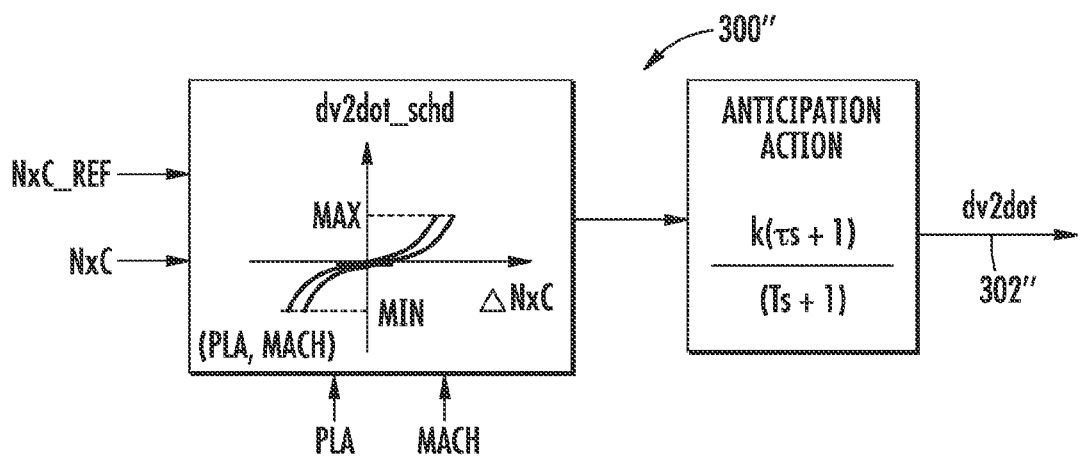
FIG. 9C shows the scheduling of the dv2dot signal in reverse thrust, phase 2.

In reverse thrust phase 2, as PLA Command new NxRef and N2Ref, Beta is put back the 2×2 Control. Nx follows the Nx_Ref_Base and transient schedule and logic are used for generating dv2dot. FIG. 9C shows the scheduling of the dv2dot signal 302" from logic 300" calculated using inputs PLA, Mach, NxC, and NxC_ref.

Figure 7D:
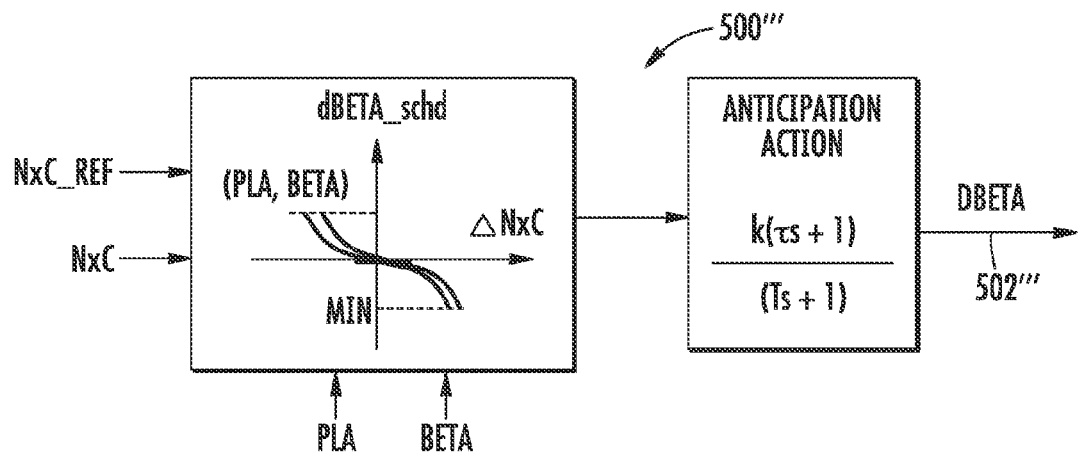
FIG. 7D shows the scheduling of the dBeta supplied to the BetaP Servo control in ground taxi mode.

Finally, in ground taxi at PLA Command, Beta is kept out of 2×2 Control, and controlled directly by the combination of Beta_Ref_Base and dBeta calculated by transient schedule and logic. Beta_Ref_Base schedules Beta in negative region for thrust reverse or positive region for thrust forward but not go beyond flight fine limit Beta_FFL. The transient schedule & logic of dBeta is to compensate Nx response to NxRef. FIG. 7D shows the scheduling of the dBeta 502''' supplied to the BetaP Servo control 64. The dBeta 502''' is calculated using inputs PLA, Nx, Beta, and NxC_ref to set the pitch of the rotor blades 1021 in the ground taxi mode.

It is noted that the input 402 supplied by dv1dot 400 is optional, but would be consistent with the input 302 supplied by dv2dot 300 if applied.

The anticipation action cab be either $$\frac{k(\tau s + 1)}{(Ts + 1)} \text{ or } \frac{ks}{Ts + 1}$$

where k, T, τ may have different values for the above scheduled actions, respectively.

A controlled plant 28 comprises functional elements that represent variable pitch fan engines and Turboprop engines and Turbo-shaft engines . . . .

Accordingly, thrust scheduling methods are described for variable pitch fan, turbo-shaft, and turbo-propeller engines. In one embodiment, at least one condition input is received into a control system (e.g., from a respective sensor) for base reference generation and at least one output measurement is received into a control system for transient schedules and logic. Control command can also be received into the control system from a full authority digital control. Base references of controlled outputs are generated and coordinated by using same major operating condition inputs (e.g., a low pressure shaft speed base reference and a high pressure shaft speed base reference) and using some controlled output measurements as inputs (e.g., a Beta base reference uses corrected low pressure shaft speed as input). The transient schedules and logic are generated by using at least a controlled output and its reference and an operating condition as inputs. The transient schedules and logic are also scheduled according to different operating modes of a generic control system. The base references and the transient schedules and logic are applied for a generic control system to control the actuators and regulate the outputs.

The condition inputs can include but are not limited to aircraft speed (MACH) from a speed sensor, an engine inlet temperature input from an inlet temperature sensor, an engine inlet pressure input from inlet pressure sensor, etc.

In some embodiments, the gas turbine engine can include a plurality of guide vanes having a variable pitch angle. In such embodiments, an outer guide vane base reference can be generated from the at least one condition input received and the control command received. Additionally, the variable pitch angle of the outer guide vanes can be adjusted.

The method can also include receiving a fuel flow signal; receiving a pitch change mechanism signal; relating in a controlled plant a pitch change mechanism pitch angle (BetaP) from the pitch change mechanism signal and a fuel flow (Wf) fuel flow signal to at least two controlled outputs, wherein a first one of the controlled outputs is either propeller speed (Nx) or power turbine shaft speed (N1) and a second one of the controlled outputs is engine core speed (N2), engine pressure ratio (EPR) or engine torque (Tq). For example, the aircraft engine can include a pitch change mechanism actuator, such that the method further includes receiving a pitch change mechanism signal and relating in the controlled plant a pitch change mechanism pitch angle (BetaP) from the pitch change mechanism signal to at least two controlled outputs, wherein a first one of the controlled outputs is either propeller speed (Nx) or power turbine shaft speed (N1) and a second one of the controlled outputs is engine core speed (N2), engine pressure ratio (EPR) or engine torque (Tq).

As used herein, the term "Beta angle" refers to fan blade angle, rotor blade angle, compressor blade angle, propeller blade angle, etc. That is, the term "Beta angle" refers to the pitch of any variable blade.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. A thrust scheduling method for a gas turbine engine that includes a plurality of blades having a variable pitch beta angle, the method comprising:
   receiving into a control system at least one condition input from a respective sensor;
   receiving into a control system a low pressure shaft speed from a low pressure shaft speed sensor;
   receiving a control command from a full authority digital engine control (FADEC) in the control system;
   generating a low pressure shaft speed base reference from a first schedule logic in the control system based upon the at least one condition input received and the control command received;
   generating a beta angle base reference from a second schedule logic from the at least one condition input received, the low pressure shaft speed, and the control command received; and
   supplying the low pressure shaft speed base reference and the beta angle base reference to an engine control system, wherein the engine control system adjusts at least the pitch angle of the plurality of fan blades or a fuel flow to the engine.

2. The method as in claim 1, wherein the at least one condition input includes an aircraft speed input from a speed sensor.

3. The method as in claim 1, wherein the at least one condition input includes an engine inlet temperature input from an inlet temperature sensor.

4. The method as in claim 1, wherein the at least one condition input includes an engine inlet pressure input from an inlet pressure sensor.

5. The method as in claim 1, further comprising:
   generating a high pressure shaft speed base reference from the control command and the at least one condition input from the respective sensor.

6. The method as in claim 5, wherein the engine control system adjusts the fuel flow to the engine based upon the high pressure shaft speed base reference and an input from a high pressure shaft speed sensor.

7. The method as in claim 1, wherein the engine control system adjusts both the fuel flow and the pitch angle.

8. The method as in claim 1, wherein the gas turbine engine includes a plurality of outer guide vanes having a variable pitch angle; the method further comprising:
   generating an outer guide vane base reference from the at least one condition input received, the control command received, and the beta angle of the blade.

9. The method as in claim 8, further comprising:
   adjusting the variable pitch angle of the outer guide vanes.

10. The method as in claim 1, wherein the gas turbine engine comprises a variable pitch fan engine, a turbo-shaft engine, or a turbo-propeller engine.

11. The method as in claim 1, further comprising:
    receiving a fuel flow signal;
    receiving a pitch change mechanism signal;
    relating in a controlled plant a pitch change mechanism pitch angle (BetaP) from the pitch change mechanism signal and a fuel flow (Wf) fuel flow signal to at least two controlled outputs, wherein a first one of the controlled outputs is either propeller speed (Nx) or power turbine shaft speed (N1) and a second one of the controlled outputs is engine core speed (N2), engine pressure ratio (EPR) or engine torque (Tq).

12. The method of claim 1, further comprising:
    performing a transcient schedule in forward thrust to change the beta angle based upon NxC_Ref, NxC, PLA, and Mach.

13. The method of claim 1, further comprising:
    performing a transcient schedule in reverse thrust to change the beta angle based upon Beta_Ref, Beta, PLA, and Mach.

14. The method of claim 1, further comprising:
    performing a transcient schedule in ground mode to change the beta angle based upon NxC_Ref, NxC, PLA, and Beta.

15. The method of claim 1, further comprising:
    performing a transcient schedule in forward thrust to change the low pressure shaft speed and the beta angle based upon NxC_Ref, NxC, PLA, and Mach.

16. The method of claim 1, further comprising:
    performing a transcient schedule in reverse thrust to change the low pressure shaft speed and the beta angle based upon NxC_Ref, NxC, PLA, and Beta.

17. The method of claim 16, further comprising:
    performing a transcient schedule in reverse thrust to change the low pressure shaft speed and the beta angle based upon NxC_Ref, NxC, PLA, and Mach.

* * * * *